United States Patent
Rezvani et al.

(10) Patent No.: US 12,039,774 B2
(45) Date of Patent: Jul. 16, 2024

(54) DRONE-ASSISTED THERMAL MONITORING TECHNIQUES

(71) Applicant: Alarm.com Incorporated, Tysons, VA (US)

(72) Inventors: Babak Rezvani, St Petersburg, FL (US); Ahmad Seyfi, Reston, VA (US); Glenn Tournier, Vienna, VA (US); Donald Gerard Madden, Columbia, MD (US); Ethan Shayne, Clifton Park, NY (US)

(73) Assignee: Alarm.com Incorporated, Tysons, VA (US)

( * ) Notice: Subject to any disclaimer, the term of this patent is extended or adjusted under 35 U.S.C. 154(b) by 372 days.

(21) Appl. No.: 17/462,266

(22) Filed: Aug. 31, 2021

(65) Prior Publication Data
US 2022/0067337 A1 Mar. 3, 2022

Related U.S. Application Data

(60) Provisional application No. 63/073,057, filed on Sep. 1, 2020.

(51) Int. Cl.
| | |
|---|---|
| G06V 20/17 | (2022.01) |
| B64C 39/02 | (2023.01) |
| G08G 5/00 | (2006.01) |
| B64U 101/30 | (2023.01) |

(52) U.S. Cl.
CPC ............ *G06V 20/17* (2022.01); *B64C 39/024* (2013.01); *G08G 5/003* (2013.01); *G08G 5/006* (2013.01); *B64U 2101/30* (2023.01)

(58) Field of Classification Search
CPC ...... B64C 39/024; G06V 20/52; G06V 20/17; G06V 10/143; G08G 5/006; G08G 5/003; G05D 1/101; B64U 2101/30; B64U 2101/00
See application file for complete search history.

(56) References Cited

U.S. PATENT DOCUMENTS

| | | |
|---|---|---|
| 2008/0066540 A1 | 3/2008 | Childers et al. |
| 2010/0021288 A1 | 1/2010 | Collette |
| (Continued) | | |

FOREIGN PATENT DOCUMENTS

WO WO 2012/013878 2/2012

OTHER PUBLICATIONS

PCT International Search Report and Written Opinion in International Application No. PCT/US2021/048392, dated Dec. 8, 2021, 10 pages.

*Primary Examiner* — Anne Marie Antonucci
*Assistant Examiner* — Jared C Bean
(74) *Attorney, Agent, or Firm* — Fish & Richardson P.C.

(57) ABSTRACT

Methods, systems, and apparatus, including computer programs encoded on computer storage media, for drone-assisted thermal monitoring. One of the methods includes determining a first temperature measurement at a first location of a property, navigating from the first location to a second location of the property, determining a second temperature measurement at the second location, generating a thermal model for the property based on the first temperature measurement and the second temperature measurement, and providing the thermal model for output.

20 Claims, 6 Drawing Sheets

(56) References Cited

U.S. PATENT DOCUMENTS

| | | | |
|---|---|---|---|
| 2012/0078417 A1* | 3/2012 | Connell, II | B25J 5/00 |
| | | | 901/1 |
| 2017/0092109 A1 | 3/2017 | Trundle et al. | |
| 2017/0092138 A1 | 3/2017 | Trundle et al. | |
| 2017/0160752 A1 | 6/2017 | Boland et al. | |
| 2020/0050184 A1* | 2/2020 | Miao | B64C 19/02 |
| 2021/0232140 A1* | 7/2021 | Bart | G08B 29/145 |
| 2023/0192330 A1* | 6/2023 | Shah | G06V 20/176 |
| | | | 73/865.8 |

* cited by examiner

500

DETERMINE A FIRST TEMPERATURE MEASUREMENT AT A FIRST LOCATION OF A PROPERTY
510

NAVIGATE FROM THE FIRST LOCATION TO A SECOND LOCATION OF THE PROPERTY
520

DETERMINE A SECOND TEMPERATURE MEASUREMENT AT THE SECOND LOCATION
530

GENERATE A THERMAL MODEL FOR THE PROPERTY BASED ON THE FIRST TEMPERATURE MEASUREMENT AND THE SECOND TEMPERATURE MEASUREMENT
540

PROVIDE THE THERMAL MODEL FOR OUTPUT
550

DRONE-ASSISTED THERMAL MONITORING TECHNIQUES

CROSS-REFERENCE TO RELATED APPLICATION

This application claims the benefit of U.S. Provisional Application No. 63/073,057, filed on Sep. 1, 2020, the contents of which are incorporated by reference herein in its entirety.

TECHNICAL FIELD

This disclosure relates to home monitoring technology.

BACKGROUND

Monitoring systems often include a thermostat to regulate ambient temperature. The thermostat can be used to manually or automatically adjust the air temperature of a property. For example, a user can use the thermostat to manually adjust a set point temperature for a heating, ventilation, and air conditioning (HVAC) system of the property. In other examples, a thermostat can be configured to automatically increase or decrease set point temperature based on a temperature detected by temperature sensors placed within the property. Data collected by the thermostat can be used to maintain a specified temperature so that if the measured temperature rises or falls outside the desired threshold, the thermostat activates a cooling or heating mode of the HVAC system to adjust the temperature accordingly. In some instances, monitoring systems include stand-alone temperature sensors such as remote temperature sensors (RTS), which provide a thermostat with temperature measurements in different regions of a property.

An unmanned aerial vehicle (UAV), or a drone device, refers to an electronic device that is capable of navigating, either under remote control by a human operator, or fully or intermittently autonomously, by onboard computers. Drone devices can be associated with a monitoring system of a property to perform various types of monitoring operations of the property. For example, a camera of a drone device can capture video footage of a property premises while performing a surveillance operation.

SUMMARY

Systems and techniques are described for enabling drone-assisted thermal monitoring (e.g., using drones to collect thermal data within a property). In some implementations, a drone can be configured to operate as an autonomous temperature monitoring device capable of navigating throughout a property and measuring temperatures in specific regions of the property while navigating through the property. For instance, a drone can measure air temperatures in different regions of the property.

The drone can combine temperature data with a spatial model of the property and thereby provide a three-dimensional representation of heat accumulation within the property. For example, the drone can generate a three-dimensional map includes multiple regions of a property that are each sized to represent a 10×10×10 feet physical space within a property. In this example, the drone can detect an air temperature in each region of the property and generate a three-dimensional representation that specifies the identifiable regions of the property and an air temperature measurement associated with each region. As another example, the drone can collect air measurements from each room of a property and generate a three-dimensional representation that identifies an air temperature for the property as a whole based on aggregating individual air temperature measurements for each room of the property.

As described herein, a "thermal model" refers to a model that includes various types of thermal monitoring information that may be collected by a drone in relation to monitoring a property. For instance, the thermal model can include a set of air temperatures that includes individual air temperatures measured by the drone in each region of the property. In some instances, the thermal model can include other information pertinent to thermal monitoring, such as air flow detected in each region of the property, spatial information of the regions of the property, an identification of components, fixtures, or objects that may have an impact on temperature monitoring (e.g., doors, windows, HVAC vents, walls, etc.), among other types of information.

The drone-assisted thermal monitoring techniques disclosed herein provide various advantages over other thermal monitoring techniques in a property. For example, many property monitoring systems include thermostats that measure air temperature of a property. However, since thermostats are stationary, temperature data collected by a thermostat often reflects the temperature of air within an immediate vicinity of the location of the thermostat within the property.

While some monitoring systems employ multiple stationary thermostats placed at different locations of a property, the temperature data collected by these systems is still limited to the immediate vicinity of the thermostat's location within the property. In some circumstances, stationery thermostats can be unable to collect an accurate temperature reading if the air temperature in the vicinity of a thermostat location is not representative of the overall air temperature within the property. For example, lack of air flow and excessive sunlight entering into a room with a thermostat can result in accumulation of hot air in the room so that the temperature read by the thermostat can be too high.

However, using a drone to collect temperature reading provides a greater degree of control and functionality associated with monitoring thermal data relative to that provided by use of stationary thermostats. For example, the capable capability of a drone to navigate throughout the interior environment of a property enables a collection of a greater number of temperature measurements. As another example, a drone can use on-board sensors and a propulsion system (e.g., propellers) to navigate to hard-to-reach areas of a property to collect thermal measurements. These aspects enable a drone to provide greater diagnostic capabilities in both identifying thermal issues related to a property (e.g., limited air flow causing hot air buildup, uneven air temperature distributions causing irregular temperature readings, heating/cooling components that properly functioning).

In some instances, the drone can additionally or alternatively be configured as an intervention tool used to address problems related to thermal regulation. For example, if low air flow resulting in hot air accumulation is identified in a certain location of the property, then the propellers of the drone can be used to increase air movement at the certain location and thereby increase heat dissipation resulting from increased air movement. As another example, if air temperature detected in a room is excessively low and video data collected by the drone indicates that the windows of the room are currently open, then the drone can send a command to a control unit to close the windows. In this way, data collected by the drone can be used to diagnose (i.e., identify or monitor) issues related to thermal regulation as well as determine actions to perform to address identified issues.

In general, one innovative aspect of the subject matter described in this specification can be embodied in methods that include the actions of determining a first temperature measurement at a first location of a property, navigating from the first location to a second location of the property, determining a second temperature measurement at the second location, generating a thermal model for the property based on the first temperature measurement and the second temperature measurement, and providing the thermal model for output.

Other implementations of this and other aspects include corresponding systems, apparatus, and computer programs, may be configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects generating a thermal model for the property based on the first temperature measurement and the second temperature measurement includes generating the thermal model to specify a region-specific temperature measurement in each region of the property. In some implementations, generating a thermal model for the property based on the first temperature measurement and the second temperature measurement includes generating the thermal model to indicate that the first location has a first temperature measurement and the second location has the second temperature measurement.

In certain aspects, a thermal model for the property based on the first temperature measurement and the second temperature measurement includes generating the thermal model to specify that the thermal model corresponds to a particular time of day. In some aspects, generating a thermal model for the property based on the first temperature measurement and the second temperature measurement includes generating the thermal model to specify a positive or negative bias of each region of the property relative to a temperature regulator in a fixed location of the property.

In some implementations, navigating from the first location to a second location of the property includes following a navigation path with a predefined sequence of regions within a property. In some implementations, determining a first temperature measurement at a first location of a property is performed with a temperature sensor attached to a probe extending from a body of an airborne drone. In certain aspects, generating a thermal model for the property based on the first temperature measurement and the second temperature measurement includes determining air flow at a region based on a difference between expected motion of a drone in still air and actual motion of the drone at the region and generating the thermal model to specify the air flow at the region.

In some aspects, actions include determining a third location of the property to increase airflow based on the thermal model, navigating to the third location of the property, and directing air at the third location with propellers of a drone. In some implementations, determining a third location of the property to increase airflow based on the thermal model includes determining from the thermal model that there is low airflow at the third location of the property and based on determining from the thermal model that there is low airflow at the third location of the property, determining to increase airflow at the third location of the property. In certain aspects, providing the thermal model for output includes providing the thermal model to a control unit.

The details of one or more implementations are set forth in the accompanying drawings and the description below. Other features will be apparent from the description and drawings.

DESCRIPTION OF DRAWINGS

FIG. 5 illustrates an example of a process for using a drone to generate a thermal model for a property based on data collected by the drone.

In the drawings, like reference numbers represent corresponding parts throughout.

DETAILED DESCRIPTION

In general, techniques are described for enabling drone-assisted thermal monitoring (e.g., using drones to collect thermal data within a property). A drone can be configured to operate as an autonomous temperature monitoring device capable of navigating throughout a property and measuring temperatures in specific regions of the property while navigating through the property. For example, a drone can measure air temperatures in different regions of the property and generate a thermal model for the property. The drone can combine temperature data with a spatial model of the property so that the thermal model provides a three-dimensional representation of heat accumulation within the property. As another example, the drone can collect ambient measurements from each room of a property and compute an ambient temperature for the property based on aggregating the air temperature measurements.

As described throughout, "real-time" refers to information or data that is collected and/or processed instantaneously with minimal delay after the occurrence of a specified event, condition, or trigger. For instance, "real-time data" refers to data, e.g., sensor data, that is processed with minimal delay after a sensor collects or senses the data, e.g., using a temperature sensing element. The minimal delay in collecting and processing the collected data is based on a sampling rate or monitoring frequency of the sensor, and a time delay associated with processing the collected data and transmitting the processed data to a receiving device, e.g., a robotic device. As an example, on-board sensors of a drone can collect thermal data in real-time to monitor changes in the interior environment of a property over time and/or compare the collected thermal data to known or expected conditions for the interior environment of the property. The system can then process the collected thermal data in relation to a set point temperature configuration to, for instance, determine how to configure an HVAC system so that air temperature satisfies the set point temperature configuration.

Figure 1:
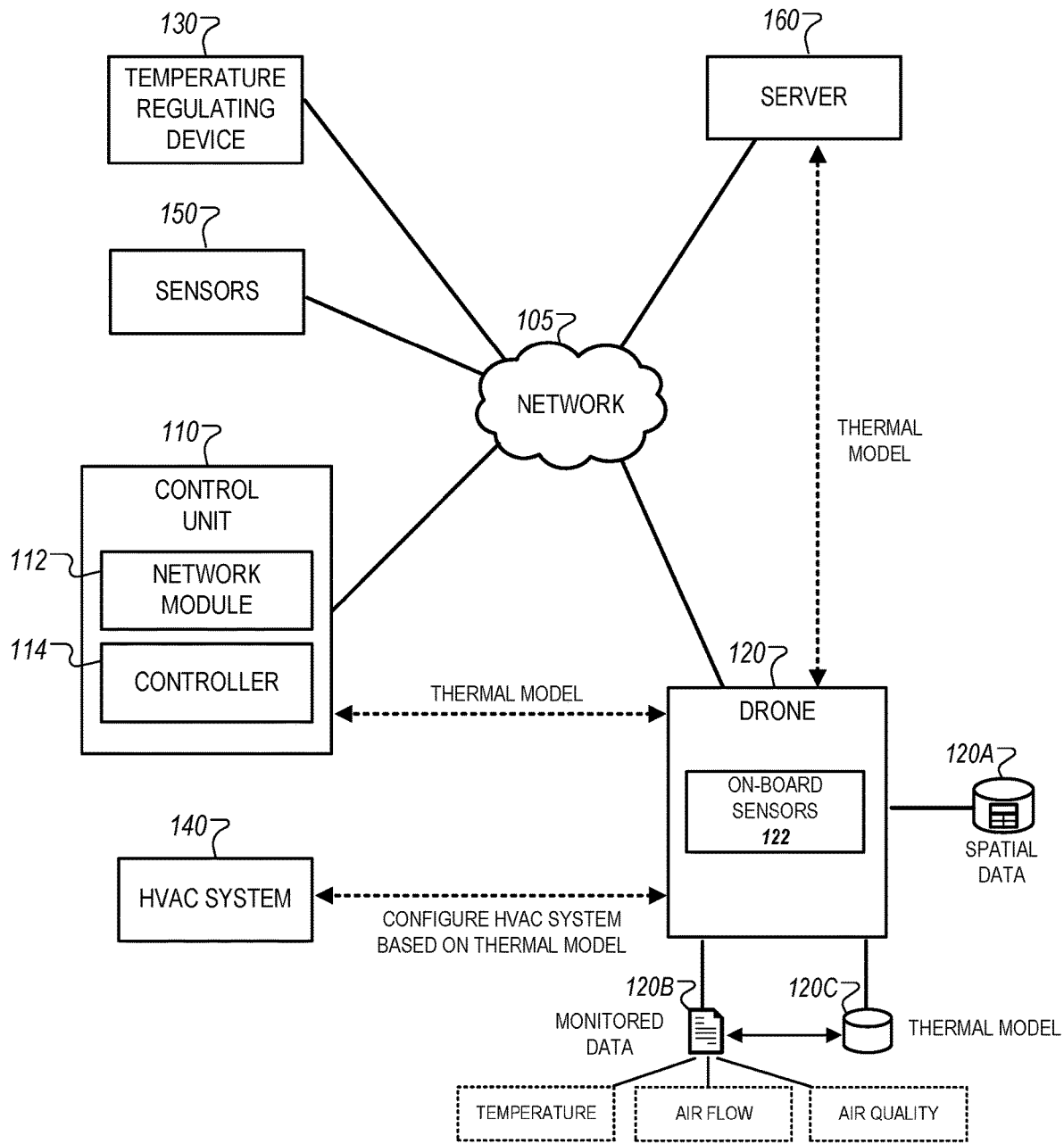
FIG. 1 illustrates an example of a system that is capable of using a drone to generate a thermal model for a property based on data collected by the drone.

FIG. 1 illustrates an example of a system 100 that is capable of using a drone to generate a thermal model for a property based on data collected by the drone. The system 100 includes a control unit 110, a drone 120, a temperature regulating device (TRD) 130, an HVAC system 140, sensors 150, and a server 160.

In general, the system 100 can be used to enable drone-assisted thermal monitoring. As discussed throughout, this involves using a drone to perform operations related to thermal monitoring while navigating throughout different locations of a property, such as measuring air temperature, detecting air flow, monitoring air quality, monitoring objects or fixtures related to thermal monitoring (e.g., doors, windows, fans), among others. The system 100 can process data collected by the drone for diagnostics (e.g., identifying issues related to thermal regulation within the property), configuration (e.g., configuring HVAC system components to heat or cool the property), and/or intervention (e.g., sending a drone to a location with limited or no air flow to improve heat dissipation). Each of these categories of operations are discussed in greater detail in the descriptions that follow.

Referring now to the components of the system 100, the network 105 can be configured to enable electronic communications between electronic devices. For example, the network 105 can be configured to enable exchange of electronic communications between the control unit 110, the drone 120, the TRD 130, the HVAC system 140, the sensors 150, and the server 160.

The network 105 can include Local Area Networks (LANs), Wi-Fi, or analog or digital wired and wireless networks. The network 105 can include multiple networks or subnetworks, each of which can include, for example, a wired or wireless data pathway. The network 105 can also include a circuit-switched network, a packet-switched data network, or any other network able to carry electronic communications (e.g., data or voice communications). For example, the network 105 can include networks based on the Internet protocol (IP), or other comparable technologies. In some examples, the network 105 can include wide area networks (WAN) of computers that receive services provided by a service provider.

The control unit 110 can be a computing device that controls aspects of monitoring operations performed by the components of the system 100. The control unit 110 can include a network module 112 and a controller 114. The network module 112 can be a communication device configured to exchange communications over the network 105. The network module 112 can be a wireless communication module configured to exchange wireless communications over the network 105. For example, the network module 112 can be a wireless communication device configured to exchange communications over a short-range wireless network. The network module 112 can also be configured to exchange communications over the network 105 using a wireless connection. For instance, the network module 112 can enable the control unit 110 to exchange communications with the server 160 over the network 105 without the use of the network 105. The wireless communication device can include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, Wi-Fi, or cellular-based networks (e.g., 2G, 3G, 4G, 5G, etc.).

The network module 112 can also can be a wired communication module configured to exchange communications over the network 105 using a wired connection. For instance, the network module 112 can be a modem, a network interface card, or another type of network interface device. The network module 112 can be an Ethernet network card configured to enable the control unit 110 to communicate over a local area network and/or the Internet. The network module 112 can also be a voiceband modem configured to enable an alarm panel to communicate over the telephone lines of Plain Old Telephone Systems (POTS). In some implementations, the alarm panel can be a broadband or cellular gateway where the network module can enable the control unit 110 to communicate over the network 105.

The control unit 110 can communicate with the drone 120, the TRD 130, the HVAC system 140, the sensors 150, and the server 160 wirelessly transmit data generated from the components of the system 100 over the network 105. In some instances, the control unit 110 can periodically receive data activity reports from the drone 120, the TRD 130, the HVAC system 140, the sensors 150, and the server 160 that include information related to the property, e.g., occupancy data, activity data, movement data, temperature data, among others.

In addition, the control unit 110 can periodically receive sensor data collected by the drone 120, the TRD 130, the HVAC system 140, and/or the sensors 150. For example, the control unit 110 can periodically receive temperature data collected by the drone 120 and generate reports to provide for output to an occupant of the property. As another example, the control unit 110 can obtain a temperature reading by the TRD 130 and, prior to initiating a heating or cooling operation by the HVAC system 140, provide the temperature reading to the drone 120.

The drone 120 can be an unmanned device that is capable of movement through a property to perform operations related to thermal monitoring or regulation. For example, the drone 120 can be capable of moving throughout a property based on automated control technology and/or input control provided either by the user or by the server 160. In such an example, the drone 120 can be able to fly, roll, walk, or otherwise move about the property.

The drone 120 can include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone 120 can be a robotic device that is intended for other purposes and merely associated with the system 100 for use in appropriate circumstances. For example, a security drone can be associated with the system 100 as the drone 120 and can be controlled to take action responsive to system events.

The drone 120 can be configured to automatically navigate within a property. For example, the drone 120 can include on-board sensors 122 and control processors that guide movement of the drone 120 within the property. The one-board sensors 122 can include one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The on-board sensors 122 permit the drone 120 to move along a navigational path that reaches the desired destination and avoids obstacles. In this regard, the control processors detect walls or other obstacles in the property and guide movement of the drone 120 in a manner that avoids the walls and other obstacles.

The on-board sensors 122 also include sensors that permit the drone 120 to collect, monitor, and/or evaluate thermal data as discussed throughout. The on-board sensors 122 can include one or more temperature sensors for measuring air temperature within the property, one or more air flow sensors for detecting air flow within the property, and/or one or more air quality sensors for monitoring air quality within the property. In some instances, the temperature sensors, air flow sensors, and air quality sensors are attached to a body of the drone 120 so that sensed data (e.g., air temperature, air flow, air quality) is collected based on a location of the drone 120 within the property. Additionally, or alternatively, the temperature sensors, air flow sensors, and air quality sensors can be attached to a probe extending from the body of the drone 120. For example, attachment of a temperature sensor to the probe permits isolation from heat that may be generated by drone 120 and/or the draft produced by the propeller of the drone 120. As another example, the temperature sensor can positioned to take advantage of the draft produced by propellers of the drone 120 and allow sampling of air in a different location from the drone 120. In some instances, the drone 120 can include thermal cameras to correct for and/or avoid thermal contamination that may result from operation of the drone 120 components (e.g., heat generated by spinning propellers, disruptions in hot/cold air flow based on movement of the drone 120 through a physical space, etc.). In such instance, the thermal cameras of the drone 120 can be used in addition or as an alternative to temperature sensors of the drone 120.

In some implementations, the drone 120 includes air flow sensors to measure airflow through the property. In such implementations, the drone 120 can measure air movement using a closed loop motion control. To detect air flow, the drone 120 can use, for example, visual inertial odometry (VIO), by estimating velocity of air flow relative to reference objects. For example, air movement can be inferred by evaluating the delta between motion inputs expected in still air and motion inputs required to keep an intended trajectory of movement. In some instances, air flow measurements can be used to incorporated into one or more models (e.g., spatial model, thermal model). For example, air flow detected at a vent can incorporated into a spatial model identifying vent placement and angle of air flow. The combined air flow and spatial information can then be used to control the HVAC system 140 to enable air flow through the vent to minimize the energy required for efficient operation. For example, if the drone 120 detects poor air flow in a problem area of the room, the HVAC system 140 can be configured to redirect more air through a vent nearby the problem area. This technique can be used to address a large temperature disparity in the problem area resulting from the lack of air flow in the problem area. As another example, if the drone 120 detects poor air flow in an unexpected part of a room, then the drone 120 can indicate a likely failure in the HVAC system 140.

In some implementations, the drone 120 can include other types of sensors. The drone 120 can include one or more thermal cameras configured to measure surface temperatures in the property. In some instances, surface temperatures can be used to augment and/or replace air temperature measurements for thermal monitoring. For example, if the drone 120 is unable to access a particular area of the property, then surface temperatures can be used in lieu of air temperature measurements for thermal monitoring. Additionally, or alternatively, the drone 120 can also include air quality sensors that detect the presence of air contaminants, such as smoke, carbon dioxide, hydrocarbons, or particulate matter. Air quality measured by the drone 120 can then be used to provide environmental context for other measurements, such as temperature measurements and air flow measurements. Air quality problems identified by the drone 120 can be addressed with our without requiring user intervention depending on the severity of the identified problems. For example, if the drone 120 determines an air quality problem resulting from a property condition that requires repair (e.g., lead paint on walls), then an alert of the air quality issue may be provided to a user device due to additional repairs being necessary to address the issue. As another example, if the drone 120 determines an air quality problem resulting from smoke entering the property through a particular window, then the drone 120 may be instructed to close the window automatically without providing any trigger or alert to the user. In this example, an alert is not provided to the user given that the air quality issue can be sufficiently addressed without any user intervention.

The drone 120 can store data describing attributes of the property in a spatial data 120A. The spatial data 120A can include a floorplan and/or a three-dimensional representation of the property that enables the drone 120 to navigate the property. During initial configuration, the drone 120 can receive the data describing attributes of a property, determine a frame of reference to the data (e.g., a home or reference location in the property), and navigate the property based on the frame of reference and the data describing attributes of a property. In some instances, the spatial data 120A includes information that enables the drone 120 to perform diagnostics related to thermal monitoring or regulation. For example, the spatial data 120A can identify locations of HVAC system 140 components (e.g., fans, vans) so that the drone 120 can use collected sensor data and the spatial data 120A to determine if the components are properly functioning. As another example, the spatial data 120A can identify locations of heat-generating elements (e.g., appliances, windows) so that the drone 120 can use collected sensor data and the spatial data 120A to determine how to optimize HVAC operation (e.g., configuring the HVAC system 140 to cool and/or heat a property with the least amount of energy required).

The spatial data 120A may be generated in different ways across various implementations. In some implementations, the drone 120 generates the spatial data 120A based on navigating throughout a property and identifying locations, objects, or fixtures of interest. In such implementations, the spatial data 120A can be first generated during an initial registration operation and periodically updated by the drone 120 as any changes are detected in the property. In other implementations, the spatial data 120A is imported as baseline data and then updated by the drone 120. For example, the spatial data 120A can be a three-dimensional model of the property that was generated by a real estate developer when constructing the property, or data collected by other spatial sensors that are located in the property. Regardless of the technique used to obtain the spatial data 120A, the drone 120 is configured to use information specified in the spatial data 120A to determine how to optimize HVAC operation as described throughout.

Initial configuration of the drone 120 also can include learning of one or more navigation patterns in which a user or a system administrator provides input to control the drone 120 to perform a specific navigation action (e.g., fly to an upstairs bedroom and spin around while capturing video and then return to a home charging base). In this regard, the drone 120 can learn and store the navigation patterns such that the drone 120 can automatically repeat the specific navigation actions when instructed to assist a user during a detected emergency condition at the property.

In some implementations, the drone 120 can include data capture and recording devices. In these examples, the drone 120 can include one or more cameras, one or more motion sensors, one or more microphones, one or more biometric data collection tools, one or more temperature sensors, one or more humidity sensors, one or more air flow sensors, and/or any other types of sensors that can be useful in capturing monitoring data related to the property and users in the property.

In some implementations, the drone 120 can include output devices. In these implementations, the drone 120 can include one or more displays, one or more speakers, one or more projectors, and/or any type of output devices that allow the drone 120 to communicate information to a nearby user. The one or more projectors can include projectors that project a two-dimensional image onto a surface (e.g., wall, floor, or ceiling) and/or holographic projectors that project three-dimensional holograms into a nearby space.

The drone 120 also can include a communication module that enables the drone 120 to communicate other devices of the system 100. The communication module can be a wireless communication module that allows the drone 120 to communicate wirelessly. For instance, the communication module can be a Wi-Fi module that enables the drone 120 to communicate over a local wireless network at the property. The communication module further can be a 900 MHz wireless communication module that enables the drone 120 to communicate directly with the control unit 110. Other types of short-range wireless communication protocols, such as Bluetooth, Bluetooth LE, Z-wave, ZigBee, etc., can be used to allow the drone 120 to communicate with other devices in the property.

The drone 120 further can include processor and storage capabilities. The drone 120 can include any suitable processing devices that enable the drone 120 to operate applications and perform the actions described throughout this disclosure. In addition, the drone 120 can include solid state electronic storage that enables the drone 120 to store applications, configuration data, collected sensor data, and/or any other type of information available to the drone 120.

As described above, the drone 120 can exchange communications with the control unit 110, the TRD 130, the HVAC system 140, the sensors 150, and the server 160 over the network 105 (or any other suitable communication means). For example, the drone 120 can utilize a wireless data pathway configured to transmit signals from the control unit 110, the TRD 130, the HVAC system 140, the sensors 150, and the server 160 to an on-board controller of the drone 120. The control unit 110, the TRD 130, the HVAC system 140, the sensors 150, and the server 160 can continuously transmit sensed values to the controller, periodically transmit sensed values to the drone 120, or transmit sensed values to the drone 120 in response to a change in a sensed value.

In some implementations, the drone 120 can be used to perform routine surveillance operations on a property. For instance, the drone 120 can be assigned to one or more particular properties within a geographic location and can routinely collect surveillance footage during specified time periods (e.g., after dark), which can then be transmitted to the server 160 for transmitting back to each particular property owner. In such implementations, the property owner can receive the surveillance footage over the network 105 as a part of a service provided by a service provider that operates the server 160. For example, thermal data collected by the drone 120 can be part of a property monitoring service package provided by a service provider.

In some implementations, the drone 120 can monitor the operation of the control unit 110, the TRD 130, the HVAC system 140, the sensors 150, and/or the server 160. For example, the drone 120 can enable or disable the devices located within a property based on a set of rules associated with energy consumption, user-specified settings, and/or other information associated with conditions prior to, during, or after performing a particular action.

In some implementations, the drone 120 is configured or managed by a service provider entity associated with the server 160. In such implementations, the drone 120 can be provided as device component of the system 100 when the TRD 130, the HVAC system 140, or the sensors 150 are installed within a property. Alternatively, in other implementations, the drone 120 can be an after-market device that is configured to exchange data communications with components of the system 100 (e.g., the control unit 110, the TRD 130, the HVAC system 140, the sensors 150) after the system 100 has already been installed within the property. In this regard, the drone 120 can be a device from the system 100 this is configured to perform the operations described throughout.

In some implementations, the system 100 can include multiple drone devices that exchange communications with one another to perform the monitoring operations described throughout. For example, a particular drone device can be designated to monitor a specified region of the property 101. Each drone device can then transmit collected data for each designated region to, for example, the control unit 110 and/or the server 160, which then aggregates the collected data from each drone device. In such implementations, the multiple drone devices can operate as a distributed drone network to monitor region-specific property information.

The TRD 130 can be a dynamically programmable temperature regulator, e.g., a thermostat that is configured to monitor air temperature within one or multiple regions within a property. In some implementations, the TRD 130 is an integrated component of temperature monitoring device that that receives user input indicating a set point temperature that is transmitted to the control unit 110 and/or the HVAC system 140. In other implementations, the TRD 130 is a separate aftermarket device that is configured to exchange data communications with the system 100 using a data transmission protocol.

The TRD 130 can be configured to receive data indicating a set of user preferences related to energy consumption of the HVAC system or temperature comfort within a property. For example, the TRD 130 may be used to control the air temperature of the property based on a set of programmable operations based on the data indicating the set of user preferences, e.g., rules specified within a set point temperature rule repository.

The TRD 130 can be configured to control the operations of the HVAC system 140 to regulate and/or adjust the air temperature within the property. For example, the TRD 130 can transmit control signals to enable and/or disable cooling/heating operations of the HVAC system 140.

The HVAC system 140 can be a control system within a property that includes one or more components that perform operations related to thermal comfort, ventilation, indoor air quality and infiltration monitoring, and/or pressure maintenance. In some implementations, the HVAC system 140 is also configured to monitor energy consumption of individual system components, for example, by directly measuring the energy consumption of components of the HVAC system 140 or by estimating the energy usage of the components of the HVAC system 140 based on detecting usage of components of the HVAC system 140.

The sensors 150 can include various types of sensors that are placed within a property. For example, the sensors 150 can include a contact sensor, a motion sensor, a glass break sensor, an occupancy sensor, an activity sensor, or any other type of sensor that is typically included in a monitoring system or security system. The sensors 150 also can also include environmental sensors such as an ambient temperature sensor, a water sensor, a rain sensor, a wind sensor, a light sensor, a smoke detector, a carbon monoxide detector, an air quality sensor, etc. In some instances, the sensors 150 can include a radio-frequency identification (RFID) sensor that identifies a particular article that includes a pre-assigned RFID tag.

In some implementations, the system 100 can optionally include a user device. The user device can be any type of computing device that is used or associated with a user in association with a property. For instance, the user device can be one or more of a smartphone, wearable device, a tablet computing device, a laptop computing device, or a desktop computing device. The user device can be used to allow a property owner to access, control, and/or configure the system 100 through a monitoring application. For example, the monitoring application can allow the property owner to perform various actions, such as transmitting an instruction to the drone 120 to perform a thermal monitoring operation, transmitting an instruction to the drone 120 to monitor a certain region of the property to determine air temperature, or to submit information that indicates a high likelihood of low air flow or low air quality, e.g., indicating that a room is hotter than other regions of the property due to buildup of hot air inside the room.

In some implementations, the user device is configured to provide touch-sensitive interfaces that permit gesture-based control of the system 100. The user can provide gesture-based inputs (e.g., swipes, flicks, pinch-in, pinch-out, edge-based swipe) to perform various actions relating to system control. For example, the user can provide an upward swipe input to provide an instruction to the drone 120 to initiate a monitoring operation. As another example, the user can provide an edge-based swipe from the left edge of the display screen of the drone 120 to instruct the drone 120 to navigate to the room where the user is located to dissipate hot air that may be accumulating in that room.

A user can also use monitoring application to control the monitoring operations of system 100. For example, the user can use the monitoring application to turn the appliances on and off, transmit instructions to the sensors 150 to collect and/or store sensor data, or transmit an instruction to the control unit 110 to provide locally stored data to the server 160. In some instances, the monitoring application enables a user to remotely configure the components of the system 100 while he/she is away from the property. For example, the user can access the monitoring application while remote from the property and instruct the drone 120 to measure air temperatures in different regions of the property. Thermal data collected by the drone 120 can then be provided to the control unit 110, which then relays the thermal data to the server 160 (or other servers associated with the system 100) over the Internet. A user can then access the thermal data through the monitoring application so to, for instance, identify regions of the property that may have inadequate heating or cooling (and therefore susceptible to property damage).

The server 160 can be an electronic device configured to provide monitoring services in association with a property by exchanging electronic communications with the control unit 110 and/or the drone 120 over the network 105. For example, the server 160 can be configured to monitor events, e.g., thermal data periodically collected by the drone 120, a change to a set point temperature setting of the TRD 130, activity data collected the control unit 110 within the property, sensor data collected by the sensors 150, or heating/cooling operations initiated or terminated by the HVAC system 140. In these examples, the server 160 can exchange electronic communications with the network module 112 to receive information regarding events detected by the control unit 110. The server 160 can also receive information regarding events from the drone 120, e.g., data indicating region-specific air temperatures measured by the drone 120 in different regions of the property while navigating through the property.

In some implementations, the system 100 may be configured to control various parts of the HVAC system 140 as the drone 120 monitors a property. For example, the drone 120 can survey the property to identify vent locations and vent configurations (e.g., whether a particular vent is a return vent of the HVAC system 140, a HVAC zone that includes a particular vent, etc.). This type of learned information can be used to further customize and/or finely tune the thermal monitoring techniques described throughout. For example, a number of vents identified in a region of the property can be used to predict air flow through the region, which can then be used to determine whether to open or close fixtures impacting air flow (e.g., windows, doors). In this example, the drone 120 is not only configured to monitor the HVAC system 140 as a whole, but also learn how to finetune monitoring of specific HVAC components to improve thermal regulation within a property. The drone 120 can perform this type of learning passively (i.e., without any user input specifying HVAC features) or based on user input specifying the HVAC features.

In some implementations, the drone 120 is configured to perform the monitoring operations discussed throughout during an initial registration process at a property. In such implementations, the drone 120 is used to enable a one-time consultation to identify issues related to thermoregulation, such as impediments to air flow or temperature variations in different regions of the property. Data generated during this one-time consultation is then used to adjust monitoring of the property by other components of the system 100 (e.g., control unit 110, thermostat 130, monitoring server 160). In other implementations, the drone 120 is configured to perform the monitoring operations discussed throughout on a reoccurring basis (e.g., each time a seasonal adjustment occurs).

Figure 2A:
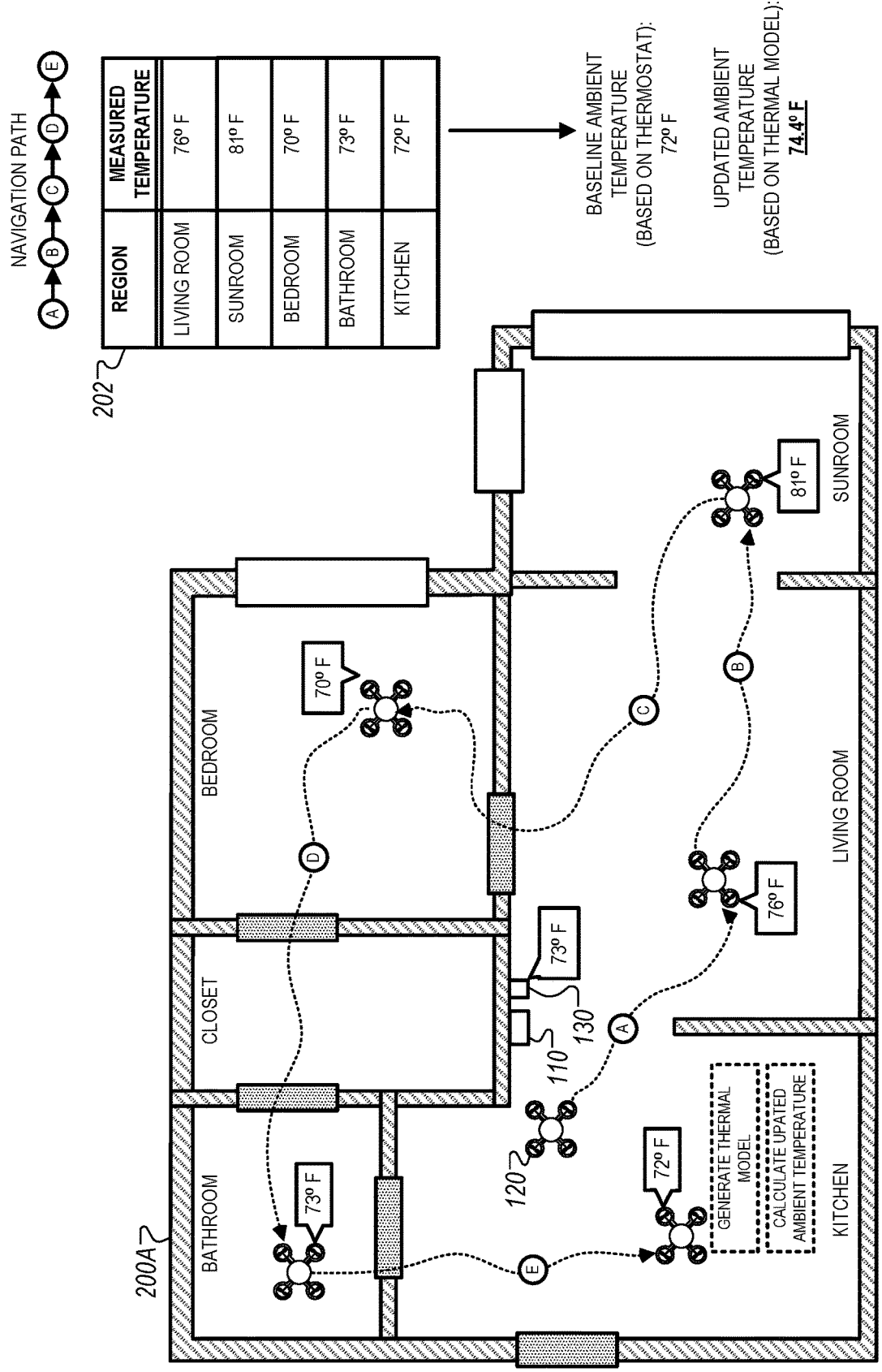
FIG. 2A illustrates an example of a technique for using a drone to collect temperature measurements in different regions of a property and determining an ambient temperature for the property based on the temperature measurements.

FIG. 2A illustrates an example of a technique for using the drone 120 to collect temperature measurements in different regions of a property 200A and determining an air temperature for the property 200A based on the temperature measurements. The drone 120 accesses a spatial model of the property 200A (e.g., the spatial data 120A) to permit navigation to different regions of the property where temperature measurements are collected.

As shown in FIG. 2A, the drone 120 follows a navigation path defined by a sequence of five travel steps that are each between two locations of the property 200A. For example, at step "A," the drone 120 initially navigates from an entrance area of the property 200A to the living room. The drone 120 then navigates from the living room to the sunroom at step "B," and then from the sunroom to the bedroom, the bathroom, and the kitchen at steps "C," "D," and "E," respectively. The drone 120 collects temperature measurements after navigating to each location to identify an air temperature in each corresponding region of the property 200A. For example, after completing step "A," the drone 120 measures a temperature of 76° F. as the air temperature in the living room of the property 200A. After completing steps "B" through "E," the drone 120 measures temperatures of 81° F., 70° F., 73° F., and 72° F., respectively.

After completing the navigation path, the drone 120 uses the temperature measurements to generate data relating to thermal monitoring. As shown in FIG. 2A, the drone 120 generates a thermal model 202 that identifies each region of the property 200A and region-specific air temperatures measured by the drone 120 at each corresponding property region. The drone 120 also aggregates the region-specific temperature measurements to compute an overall temperature measurement for the property 200A. In the example depicted, the drone 120 computes an average of the region-specific temperature measurements and sets the computed average as the property temperature. In other instances, the drone 120 can apply weighting techniques to modify the calculation of the property temperature. For example, the drone 120 can identify weighting factors for each region depending on how large each region is relative to entire property, and then apply the weighting factors to more accurately represent the property temperature (e.g., the sunroom can have a 0.10 weight applied since it represents ten percent of space within the property 200A, whereas the living room can have a 0.40 weight applied since it represents forty percent of space within the property 200A).

In the example shown in FIG. 2A, the drone aggregates region-specific temperatures (i.e., temperatures measured in each region of the property 200A) to generate an ambient temperature for the property 200A. In this example, the drone 120 uses the measured air temperature of 73° by the TRD 130 as a baseline ambient temperature and generates an updated ambient temperature based on the thermal model 202. The updated ambient temperature, in this example, is 74.4° F., which is the average value of the region-specific temperature measurements specified in the thermal model 202. In other examples, generation of the ambient temperature using thermal model 202 can occur in other ways. For instance, the air temperature measured by the TRD 130 can be another region-specific temperature specified in the thermal model 202. In other instances, instead of averaging the region-specific temperature measurements, the ambient temperature can be calculated by determining the positive or negative bias of each region-specific temperature measurement and adjusting the air temperature measured by the TRD 130 accordingly.

The drone 120 can also aggregate region-specific temperatures to generate a more representative (or more accurate) temperature measurement of the property relative to the air temperature measured by the TRD 130. For instance, while the measured air temperature of 73° F. closely reflects the air temperatures in the bathroom and kitchen (which are in the vicinity of the location of the TRD 130 within the property 200A, the measured air temperature does not closely reflect the air temperatures in the sunroom (which has an air temperature of 81° F.) or the living room (which has an air temperature of 76° F.). In such instances, a user occupying either the sunroom or the living room may perceive the air temperature of the property to be hotter than the air temperature measured by the TRD 130. In this respect, the air temperature measured by the TRD 130 may not accurately reflect the air temperature perceived by the user when occupying regions of the property that are exceptionally hot or cold and therefore deviate from the measured air temperature.

Temperature monitoring by the drone 120 using the thermal model 202 can be used to further improve upon the temperature monitoring techniques performed by the TRD 130 in various ways. For instance, because the thermal model 202 includes region-specific temperatures, hot or cold spots in the property 200A can be identified. Moreover, because the temperature monitoring device (i.e., the drone 120) is capable of moving throughout the property 200A, specific areas within a region can also be identified and/or investigated.

Since the drone 120 can be configured to operate as an autonomous device, the drone 120 can also periodically monitor region-specific air temperature (e.g., hourly, daily, weekly, monthly, e.g.,) and update the thermal model 202 each time temperatures are measured to permit dynamic monitoring region-specific temperature measurements. For example, using such monitoring techniques, the drone 120 can determine that the temperature difference between the kitchen and the sunroom is the greatest in the sunroom between 2 PM and 4 PM on sunny days. This allows the determination that poor heat dissipation in the sunroom is the cause of the temperature differential. As another example, the drone 120 can correlate region-specific temperature measurements with the initiation and/or termination of heating or cooling operations using the HVAC system 140. In this example, for instance, the drone 120 can determine that small variations in measured temperature in the sunroom before a cooling operation is initiated and while the cooling operation is running means that the air temperature in the sunroom is unlikely to be impacted by operation of the HVAC system 140.

In some implementations, the drone 120 can be configured to observe movement within regions of the property 200A and perform dynamic monitoring based on the observed movement. For example, the drone 120 can recognize that people have congregated in the living room and that the kitchen is currently empty. In response, the drone 120 can configure the HVAC system 140 to reduce heating in the kitchen and increase heating in the kitchen.

Figure 2B:
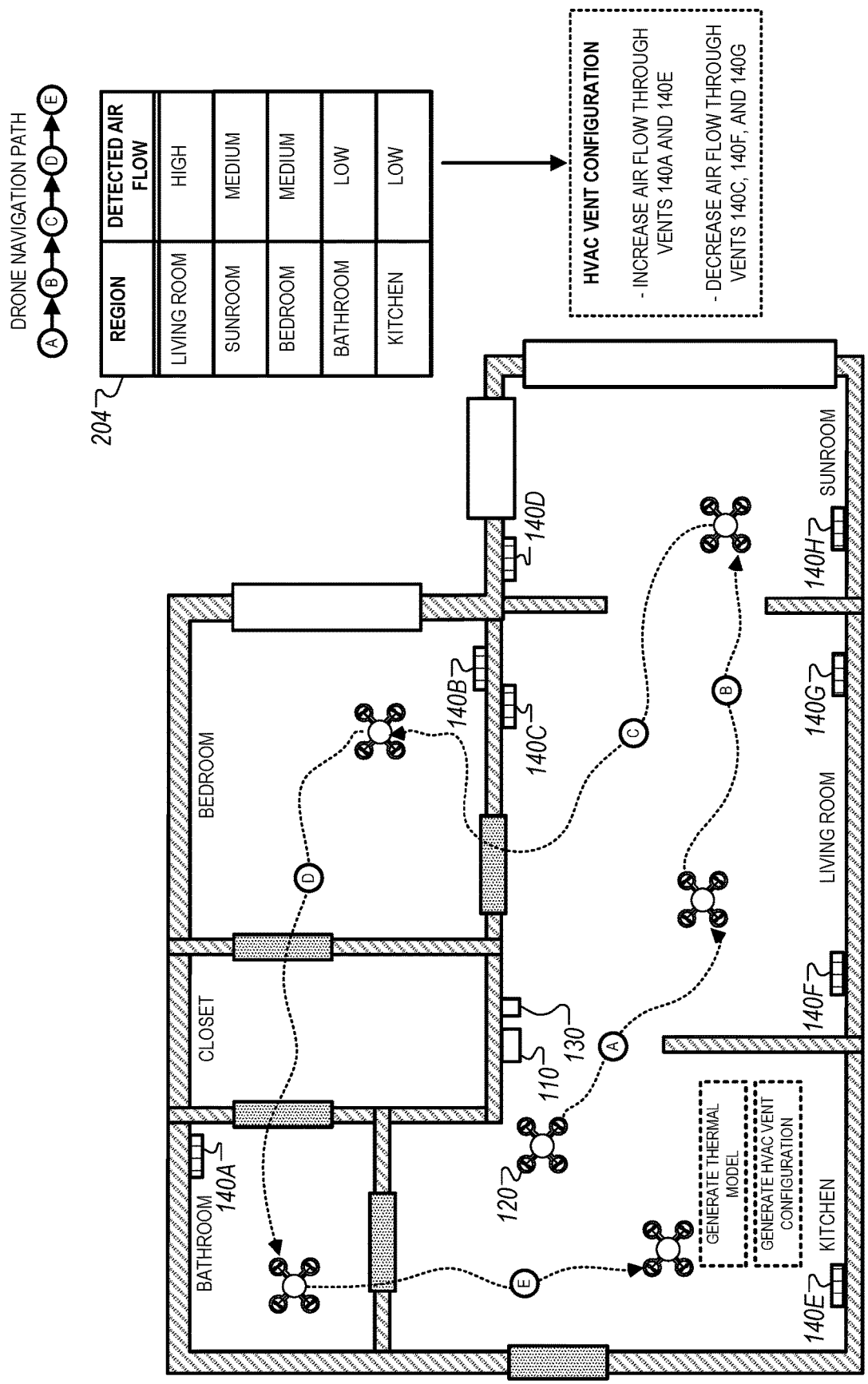
FIG. 2B illustrates an example of a technique for using a drone to detect air flow in different regions of a property and configuring an HVAC system of the property based on the detected air flow.

FIG. 2B illustrates an example of a technique for using the drone 120 to detect air flow in different regions of a property 200B and configuring an HVAC system of the property 200B (e.g., HVAC system 140) based on the detected air flow.

In the example shown in FIG. 2B, the drone 120 follows a similar navigation path as the one shown in FIG. 2A. The navigation path is defined by a sequence of five travel steps that are each between two locations of the property 200B. In the example shown in FIG. 2B, the drone 120 detects air flow after navigating to a location within each corresponding region of the property 200A. For example, after completing step "A," the drone 120 detects high air flow in the living room of the property 200A. After completing steps "B"

through "E," the drone 120 detects medium air flow in the sunroom and bedroom, and low air flow in the bathroom and kitchen.

After completing the navigation path, the drone 120 uses the air flow measurements generate data relating to air flow monitoring. As shown in FIG. 2B, the drone 120 generates an air flow model 204 that identifies each region of the property 200B and region-specific air flow detected by the drone 120 at each corresponding property region. The drone 120 also aggregates the region-specific air flow to generate an HVAC configuration that is likely to improve air flow through the property 200A. In the example shown, the drone 120 identifies eight vents of the HVAC system in property 200A (vents 140A-H) and configures each vent based on the air flow detected in each corresponding region. For example, drone 120 provides a configuration instruction to the HVAC system 140 to increase air flow through vents 140A and 140E since these vents are located in the bathroom and kitchen, respectively (which are detected to have low air flow). The configuration also decreases air flow through vents 140C, 140F, and 140G since these vents are located in the living room (which is detected to have high air flow). Using the configuration instruction, the drone 120 can adjust air flow in a way that, for instance, reduces temperature fluctuations that may result from air flow disparities in different regions of the property 200B.

The air flow measurement techniques shown in FIG. 2B can be implemented separately or in combination with the temperature measurement techniques shown in FIG. 2A in various implementations. For instance, in some implementations, the drone 120 is configured to measure both temperature and air flow while navigating through a property and then process both types of data in parallel to make certain determinations and/or conclusions based on processing both types of measurements. For example, the drone 120 can combine an abnormally high temperature measurement and a low air flow measurement in the sunroom to determine that lack of air flow may be the cause of the high temperature measurement. In some instances, parallel processing of temperature and airflow measurements can be used for diagnostics. For example, an abnormally high temperature measurement and a low air flow measurement can be used to investigate a configuration of a vent placed in the same room.

Figure 3:
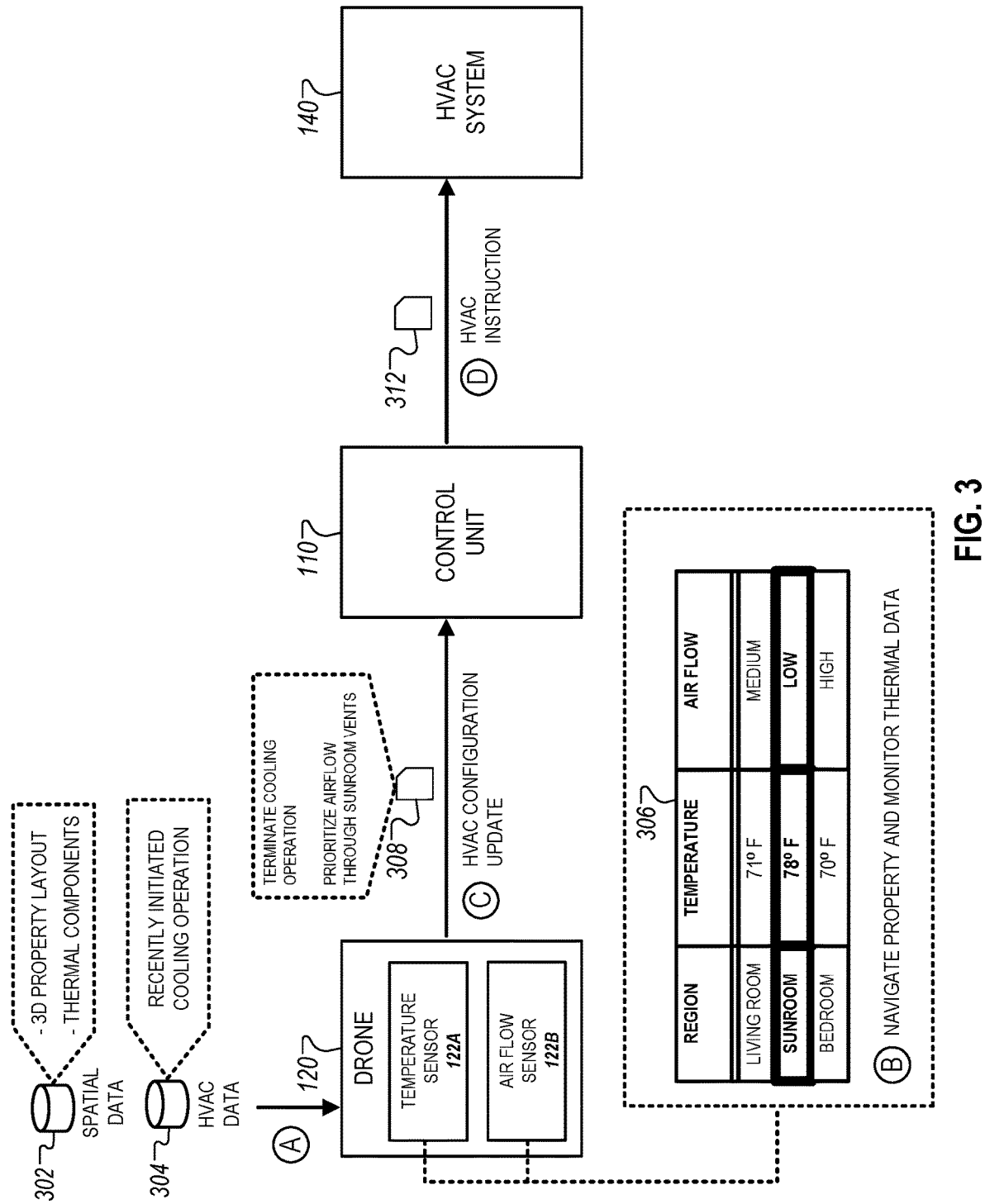
FIG. 3 illustrates an example of a technique for adjusting a present configuration of an HVAC system of a property based on data collected by a drone while navigating through the property.

FIG. 3 illustrates an example of a technique for adjusting a present configuration of the HVAC system 140 based on data collected by the drone 120 while navigating through a property. As shown, the drone 120 includes a temperature sensor 122A for monitoring air temperatures in a property (e.g., using the technique shown in FIG. 2A). The drone 120 also includes an air flow sensor 122B for monitoring air flow in a property (e.g., using the technique shown in FIG. 2B).

The technique shown in FIG. 3 occurs in a sequence of steps. At step "A," the drone 120 obtains spatial data 302 and HVAC data 304. The spatial data 302 includes various types of spatial information of a property, such as a three-dimensional layout (e.g., in a spatial model) or an identification of components to be monitored for thermal activity (e.g., HVAC vents, windows, doors, walls, etc.). The HVAC data 304 includes monitored information associated with an HVAC system 140 located in a property, such as historical data of recently performed operations or an indication that a certain type of heating/cooling operation has been recently initiated. As discussed throughout, the drone 120 uses the spatial data 302 and the HVAC data 304 to determine how and when to adjust the configuration of an HVAC system 140 to improve efficiency and/or temperature settings within a property.

At step "B," the drone 120 navigates about a property and monitors thermal data associated with the property. For example, the drone 120 can perform one or more monitoring operations similar to the techniques shown in FIGS. 2A and 2B. The drone 120 generates monitoring data 306 based on the monitoring operations that were performed. The monitoring data 306 identifies three regions of the property (e.g., living room, sunroom, bedroom), and a respective ambient temperature and air flow detected by the drone 120 at each region of the property.

The drone 120 evaluates information specified in the monitoring data 306 to determine if an adjustment to the present configuration of an HVAC system 140 may be beneficial. In some instances, the drone 120 may use one or more models that are trained to identify patterns within monitoring data that are indicative of specified conditions within the property. For example, the drone 120 can apply a machine learning model that is trained to identify a region of the property that may be experiencing overheating due to a poor vent performance (e.g., air flow through a vent may be limited).

In the example shown in FIG. 3, the drone 120 determines that the sunroom may be overheating due to poor air flow through a vent in the sunroom. The drone 120 determines this based on the monitoring data 206 indicating an air temperature of 78° F. in the sunroom (which is significantly higher than the air temperatures in other regions of the property) and low detected air flow.

The drone 120 can also evaluate the information within the monitoring data 306 in relation to the present condition of the HVAC system 140 to determine if a change to the present condition may be helpful or necessary. For instance, the drone 120 determines that the set point temperature is 71° F., the air temperature measured by the thermostat is 74° F., and the HVAC system 140 is currently running a cooling operation (based on the set point temperature being lower than the air temperature measured by the thermostat).

At step "C," the drone 120 generates an HVAC configuration update 308 based on evaluating the monitoring data 306. For instance, the drone 120 determines that continuing a cooling operation by the HVAC system 140 may not be the most efficient technique to cool the property since the air temperatures in the living room and bedroom are both below the set point temperature and the cooling operation may not be significantly impacting the air temperature within the sunroom (based on low detected air flow). Based on this, the drone 120 may determine that the more efficient technique may be to prioritize airflow through vents by decreasing air flow through the vents in the living room and bedroom and increasing the relative air flow through the sunroom. The drone 120 provides the HVAC configuration update 308 to the control unit 110 to adjust the present configuration of the HVAC system 140.

At step "D," the control unit 110 transmits an HVAC instruction 312 to adjust a present configuration of the HVAC system 140. As discussed above, the HVAC instruction 312 causes the HVAC system 140 to terminate a present cooling operation and instead prioritize air flow through the sunroom vents. For example, the HVAC system 140 may close the vents in the living room and bedroom to increase air flow through the sunroom vent and thereby increase air flow into the sunroom. In this way, by terminating the cooling operation, the HVAC system 140 can conserve energy associated with continuing the cooling operation since the cooling operation is no longer needed in the living room and bedroom and may not be having a significant impact on the air temperature inside the sunroom.

Figure 4:
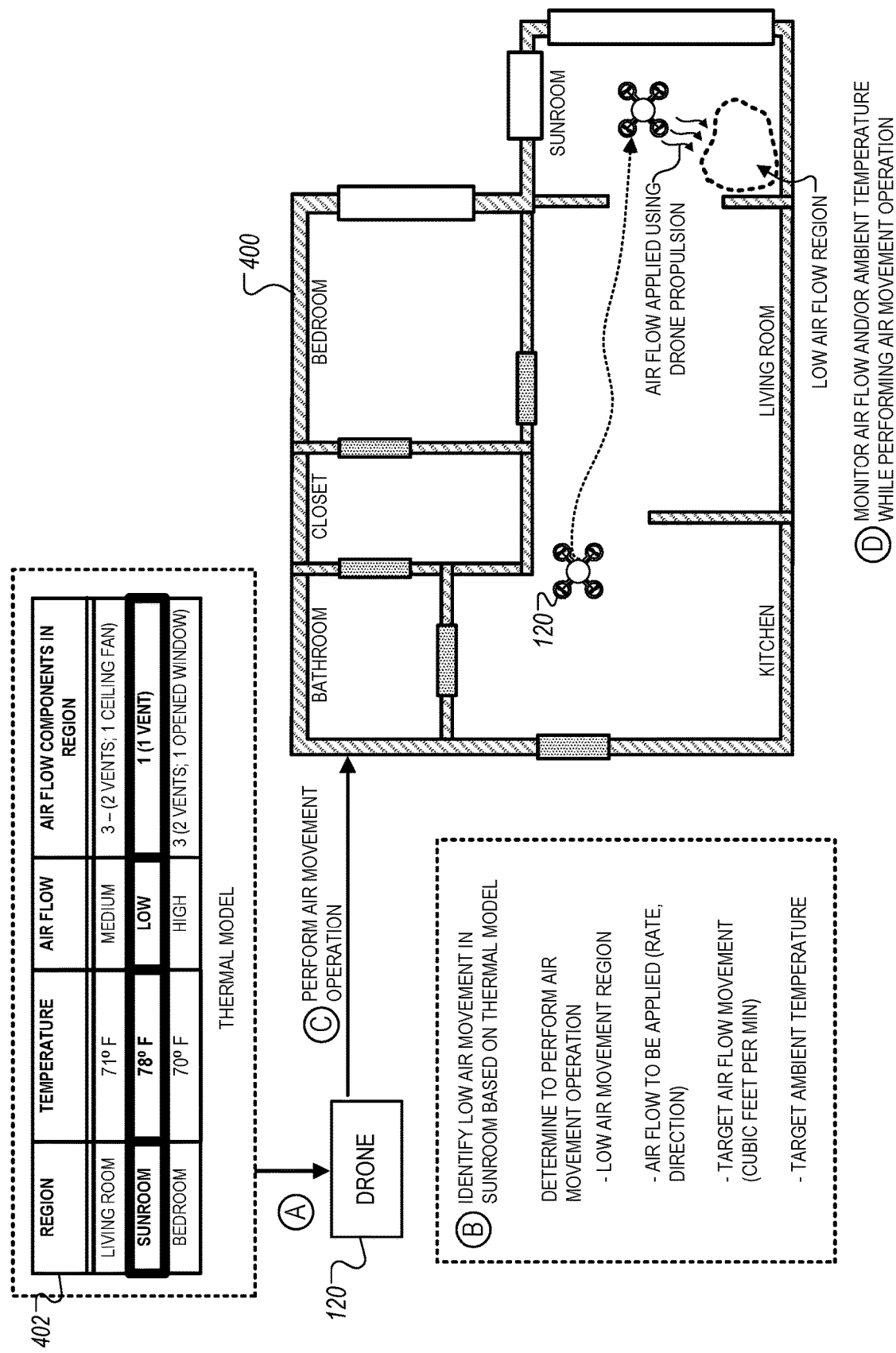
FIG. 4 illustrates an example of a technique for using a drone to improve air flow within a property.

FIG. 4 illustrates an example of a technique for using the drone 120 to improve air flow within a property 400. As shown, the drone 120 uses a thermal model 402 to identify areas in the property 400 that may benefit from increased air flow. For example, the propellers of the drone 120 can increase air flow in a certain direction within the property to increase, for instance, heat dissipation or improve the application of cool/hot air to surfaces in the property 400.

The technique shown in FIG. 4 occurs in a sequence of steps. At step "A," the drone 120 identifies the sunroom as a region of the property 400 that lacks sufficient air flow. The drone 120 can make this determination based on evaluating the measured air temperature and air flow within regions of the property in relation to air flow components in each region. For instance, based on evaluating the information specified by the thermal model 402, the drone 120 determines that air temperature in the sun room is relatively high (e.g., above 73° F.), air flow is typically low, and that there is a single vent for pushing air in the sun room. Based on this, the drone 120 identifies the sun room as an area in the property that may benefit from supplemental air flow.

At step "B," the drone 120 identifies determines to perform an air movement operation based on the thermal model 402. The air movement operation can involve the drone 120 navigating to a region of the property and providing air flow to an area of the region that is detected to have limited air flow. For instance, the drone 120 can adjust its positioning so that its propellers are faced in a certain direction to direct air flow. The drone 120 can also identify parameters of the air movement operation, such as the rate of air flow to be applied, the target air flow movement (e.g., cubic feet per minute), or the target air temperature in a corresponding area after supplying air flow.

At step "C," the drone 120 performs an air movement operation in the sunroom. As shown in FIG. 4, the drone 120 identifies the back left area (from a top-down perspective) of the sun room as an area that has limited air movement based on, for instance, monitoring air flow throughout the sun room. The drone 120 then adjusts its positions so that air flow is applied to the area using the propellers of the drone 120. The drone 120 can control its propeller to increase the speed to increase or decrease the amount of air flow that is supplied to an area of interest. In some instances where multiple areas of a region are identified to have limited air movement, the drone 120 can use its propellers to emulate a moving fan to improve air circulation within the region. In other instances, the drone 120 can adhere or walls or ceilings or otherwise constrain its movement based on a geometry of the region and/or the location of the area of limited air movement relative to other areas of the region with better air movement. The drone 120 can be configured to operate its propellers such that constant air flow is being directed to an area while also maintaining the spatial location of drone 120 within the property region. In some instances, the drone 120 can adhere to a wall or ceiling to enable charging. For example, a docking station may be placed on a wall or ceiling so that adherence by the drone 120 to the wall allows the drone 120 to charge while performing a designated monitoring operation, such as providing constant air flow to a region of a property. Charging while performing the monitoring operation enables the drone 120 to continue to operate for prolonged timed periods.

At step "D," the drone 120 monitors air flow and/or air temperature while performing the air movement operation. For instance, the drone 120 can monitor can continuously or periodically (e.g., every minute) monitor thermal data and/or air flow data while supplying air flow to the area of the region to determine a time to stop the air movement operation. For example, the drone 120 can monitor a surface temperature of a wall adjacent to the area in which air flow is being provided and stop performing the air movement operation once the surface temperature satisfies a threshold surface temperature. In this example, the drone 120 uses the surface temperature as an indicator of sufficient air movement in the corresponding area of a region. In other examples, the drone 120 can monitor air flow before and after the air movement operation to determine if air circulation has temporarily improved as a result of the air movement operation.

In some implementations, the drone 120 can be configured to perform different types of air movement operations depending on whether hot or cool air is desired to be applied to an area of a region within the property 400. For example, since warm air tends to settle near the ceiling, the drone 120 can direct air flow near the ceiling of an area if the objective of the air movement operation is to improve heat dissipation. Alternatively, since cool air tends to settle near the floor, the drone 120 can use, for instance, a heat gun to supply warm air towards the floor to warm the area in an efficient manner. In some instances, the drone 120 can be used in combination with other fixtures or air flow components, such as a fixed ceiling fan or HVAC vents to improve the efficacy of the air movement operation. For example, if warm air is being supplied to improve cooling in an area that lacks an HVAC vent, then a ceiling fan can be controlled relative to the drone 120 to improve the circulation of warm air being supplied by the drone 120.

In some implementations, the drone 120 can perform the air movement operation to coordinate movement of air between different regions of the property 400. For example, if the living room is identified to have three HVAC vents (and therefore have high air movement within this region of the property 400), then drone 120 can use its propellers to improve the movement of air from the living room to the sunroom (which is identified to have low air movement). In this way, the drone 120 can increase air movement between different regions of the property 400 to improve air mixing. In a similar manner, if the drone 120 detects temperature or air flow disparities between different regions of the property 400, the drone 120 can perform an air movement operation to address such disparities. For example, if limited air flow in two adjacent regions results in a large air temperature differential between the two regions due to a limited-sized opening, then the drone 120 can supply air flow through the opening to improve air circulation between the two regions.

FIG. 5 illustrates an example of a process 500 for using a drone to generate a thermal model for a property based on data collected by the drone. Briefly, the process 500 includes the operations of determining a first temperature measurement at a first location of a property (510), navigating from the first location to a second location of the property (520), determining a second temperature measurement at the second location (530), generating a thermal model for the property (540), and providing the thermal model for output (550).

In general, the process 500 can be performed by one or more components of the system 100. In some implementations, the process 500 is performed by the drone 120. For instance, one or more on-board temperature sensors can determine air temperature in regions of a property, and one or more processors of the drone 120 can generate a thermal model for the property based on the air temperatures. In other implementations, the process 500 is performed by other components of the system 100, such as the control unit 110 or the server 160. In such implementations, the drone 120 can be configured to collect raw sensor data (e.g., temperature measurements, air flow measurements) and provide the collected data to the control unit 110 or the server 160. One or more processors of the control unit 110 and/or the server 160 can then generate a thermal model for the property based on the raw sensor data. In some other implementations, individual operations of the process 500 can be performed by different components of the system 100. For example, the drone 120 can determine air temperatures in different regions of a property, and the control unit 110 or the server 160 can generate a thermal model based on the data collected by the drone 120. The descriptions below are in reference to the drone 120 for simplicity.

In more detail, the process 500 includes the operation of determining a first temperature measurement at a first location of a property (510). For instance, the drone 120 can determine a temperature measurement at a first location of a property. In the example shown in FIG. 2A, the drone 120 determines a temperature measurement after navigating to a living room of the property 200A. In this example, the temperature measurement is an air temperature collected by on-board temperature sensors of the drone 120. In some implementations, determining a first temperature measurement at a first location of a property is performed with a temperature sensor attached to a probe extending from a body of an airborne drone. For example, the temperature measurement may be taken with a probe that extends six inches above a body of the drone 120 so the effect of heat generated by the drone 120 on the temperature measurement is reduced. As discussed above, the air temperatures determined by the drone 120 can be used to identify region-specific air temperatures in each region of the property 200A.

The process 500 includes the operation of navigating from the first location to a second location of the property (520). For instance, the drone 120 can navigate from the first location to the second location of the property. In the example shown in FIG. 2A, the drone 120 navigates from the living room to the sunroom of the property 200A. As discussed above, the drone 120 can follow a navigation path with a predefined sequence of regions within a property. In some instances, the navigation path can be based on monitoring operations previously conducted by the drone 120. The drone 120 can also navigate through the property 200A using a spatial model (e.g., spatial data 120A) that identifies fixtures, entrances/exits, and/or paths within the property.

The process 500 includes the operation of determining a second temperature measurement at the second location (530). For instance, the drone 120 can determine a second temperature measurement at the second location of the property. In the example shown in FIG. 2A, the drone 120 determines a temperature measurement after navigating to a sunroom of the property 200A. In this example, the temperature measurement is an air temperature collected by on-board temperature sensors of the drone 120. As discussed above, the air temperatures determined by the drone 120 can be used to identify region-specific air temperatures in each region of the property 200A.

The process 500 includes the operation of generating a thermal model for the property (540). For instance, the drone 120 can generate a thermal model 202 for a property. In some implementations, generating a thermal model for the property based on the first temperature measurement and the second temperature measurement includes generating the thermal model to specify a region-specific temperature measurement in each region of the property. For example, as shown in FIG. 2A, the thermal model 202 specifies a region-specific temperature measurement in each region of the property 200A. In another example, the thermal model 202 may specify a temperature measurement from the drone 120 for each 10×10×10 feet physical space within the property 220A.

In some implementations, generating a thermal model for the property based on the first temperature measurement and the second temperature measurement includes generating the thermal model to indicate that the first location has a first temperature measurement and the second location has the second temperature measurement. For example, the thermal model may specify that the living room was 76° F., which is what the drone 120 measured while in the living room, and the sunroom was 81° F., which is what the drone 120 measured while in the sunroom.

In some implementations, generating a thermal model for the property based on the first temperature measurement and the second temperature measurement includes generating the thermal model to specify a positive or negative bias of each region of the property relative to a temperature regulator in a fixed location of the property. For example, the thermal model may specific 3° F. for the living room and −3° F. for the bedroom when the TRD 130 measured 73° F., 76° F. was measured in the living room, and 73° F. was measured in the bedroom.

In some implementations, the thermal model can include additional data collected by the drone 120, such as air flow detected by the drone 120 in each region of the property (as discussed in reference to FIG. 2B), features identified in each region of the property, among others. In some implementations, generating a thermal model for the property based on the first temperature measurement and the second temperature measurement includes determining air flow at a region based on a difference between expected motion of a drone in still air and actual motion of the drone at the region and generating the thermal model to specify the air flow at the region. For example, the drone 120 may determine from video that it captures that the drone 120 is not moving forward when the drone 120 is expected to move forward in still air and, in response, determine that there is corresponding airflow pushing against the drone 120 in the direction that the drone 120 was expecting to move. In another example, the drone may determine from video that it captures that the drone 120 is moving when the drone 120 is not expected to move in still air and, in response, determine that there is airflow that is moving the drone 120.

In some implementations, the thermal model can also include surface temperature measurements collected by the drone 120 when monitoring the property. In some implementations, generating a thermal model for the property based on the first temperature measurement and the second temperature measurement include generating the thermal model to specify that the thermal model corresponds to a particular time of day. For example, the drone 120 may obtain temperature measurements every two hours and may generate corresponding thermal models that each specify to which two hour interval that the thermal model corresponds.

The process 500 includes the operation of providing the thermal model for output (550). For instance, the drone 120 can provide the thermal model for output to the system 100. In the example shown in FIG. 2A, the drone 120 provides the thermal model for output to the control unit 110 and/or the server 160. In some implementations, the thermal model can be used to adjust the configuration of an HVAC system within a property.

In some implementations, the process 500 includes determining a third location of the property to increase airflow based on the thermal model, navigating to the third location of the property, and directing air at the third location with propellers of a drone. For example, the drone 120 may determine to increase airflow in a sunroom between the sunroom and the kitchen based on the thermal model, navigate to a location that is half in the kitchen and half in the sunroom, and move air from the kitchen to the sunroom. In another example, the drone 120 may navigate in a concentric shrinking spiral across a ceiling of a bedroom to disperse warm air that has settled near the ceiling throughout the bedroom.

In some implementations, determining a third location of the property to increase airflow based on the thermal model includes determining from the thermal model that there is low airflow at the third location of the property and based on determining from the thermal model that there is low airflow at the third location of the property, determining to increase airflow at the third location of the property. For example, the drone 120 may determine from the thermal model that there is little airflow in a particular corner of the bedroom and, in response, determine to increase airflow in the particular corner of the bedroom by flying inside the particular corner. In another example, the drone 120 may determine to greatly increase airflow in the particular corner of the bedroom and that the drone 120 can adhere to a portion of the wall or ceiling in the particular corner and, in response, adhere to the wall or ceiling in the particular corner and run propellers at a higher speed.

In some implementations, as discussed above, determining temperature measurements and navigating may be performed by a drone and generating the thermal model and providing the thermal model for output may be performed by a server or control unit that is in communication with the drone. For example, the drone 120 may provide the temperature measurements to the control unit 110, and the control unit 110 may then generate the thermal model from the temperature measurements and output the thermal model to be stored on the control unit 110 for use in controlling the HVAC system 140.

For example, as discussed in reference to FIG. 3, information specified in the thermal model can be used to determine whether a present configuration of the HVAC system should be adjusted. For instance, if an active cooling operation is not improving a high air temperature inside a region of the property, the drone 120 can prioritize air flow through a vent in that region of the property. In some implementations, the drone 120 can use the thermal model to perform various operations that improve thermoregulation within a property. For instance, in the example depicted in FIG. 3, information specified in the monitoring data 306 can be used to determine that a present configuration of the HVAC system 140 (e.g., active cooling operation) is not improving the air temperature and/or air flow within the sun room. In this example, the drone 120 uses this information to adjust the present configuration of the HVAC system 140 to terminate the cooling operation and instead prioritize air flow to the sun room through a specific vent in the sunroom. In this way, the drone 120 applies the thermal model to dynamically configure monitoring system component to, for instance, increase energy efficiency, improve heat dissipation in a specific region of the property, and/or reduce the possibility of performing extraneous operations.

As another example, as discussed in reference to FIG. 4, information specified in the thermal model can also be used to increase air flow in regions of a property that are identified have low air movement. For instance, if an area of a region has accumulated warm air due to no HVAC vents in that region, the drone 120 can use its propellers to direct air to the area to improve heat dissipation. In other instances, the drone 120 can be configured with a heating element (e.g., a heat gun) that allows the drone 120 to direct warm air to a region of the property that may have inadequate heating.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    capturing, by an airborne drone, a first temperature measurement at a first location of a property;
    capturing, by the airborne drone, motion data related to actual motion of the airborne drone at the first location;
    navigating, by the airborne drone, from the first location to a second location of the property;
    capturing, by the airborne drone, a second temperature measurement at the second location of the property;
    capturing, by the airborne drone, motion data related to actual motion of the airborne drone at the second location;

determining, using the motion data captured at the first location, a first air flow measurement for the first location comprising a difference between expected motion of the airborne drone in still air at the first location and the actual motion of the airborne drone at the first location;

determining, using the motion data captured at the second location, a second air flow measurement for the second location comprising a different between expected motion of the airborne drone in still air at the second location and the actual motion of the airborne drone at the second location;

generating a thermal model for the property using the first temperature measurement the second temperature measurement, the first air flow measurement, the second air flow measurement; and providing the thermal model for output.

2. The method of claim 1, wherein generating the thermal model for the property based on the first temperature measurement and the second temperature measurement comprises:

generating the thermal model to specify a region-specific temperature measurement in each region of the property.

3. The method of claim 1, wherein generating the thermal model for the property based on the first temperature measurement and the second temperature measurement comprises:

generating the thermal model to indicate that the first location has a first temperature measurement and the second location has the second temperature measurement.

4. The method of claim 1, wherein generating the thermal model for the property based on the first temperature measurement and the second temperature measurement comprises:

generating the thermal model to specify that the thermal model corresponds to a particular time of day.

5. The method of claim 1, wherein generating the thermal model for the property based on the first temperature measurement and the second temperature measurement comprises:

generating the thermal model to specify a positive or negative bias of each region of the property relative to a temperature regulator in a fixed location of the property.

6. The method of claim 1, wherein navigating from the first location to the second location of the property comprises following a navigation path with a predefined sequence of regions within a property.

7. The method of claim 1, wherein a capturing the first temperature measurement at the first location of a property is performed with a temperature sensor attached to a probe extending from a body of the airborne drone.

8. The method of claim 1, comprising:

determining a third location of the property to increase air flow based on the thermal model;

navigating to the third location of the property; and directing air at the third location with propellers of the airborne drone.

9. The method of claim 8, wherein determining the third location of the property to increase air flow based on the thermal model comprises:

determining from the thermal model that there is low air flow at the third location of the property; and based on determining from the thermal model that there is low air flow at the third location of the property, determining to increase air flow at the third location of the property.

10. The method of claim 1, wherein providing the thermal model for output comprises:

providing the thermal model to a control unit.

11. The method of claim 1, wherein determining the difference between the expected motion of the airborne drone in still air and actual motion of the airborne drone comprises:

evaluating a difference between motion inputs expected for the airborne drone in still air and motion inputs required to keep an intended trajectory of movement of the airborne drone.

12. The method of claim 1, further comprising:

generating, based on at least one of the first air flow measurement and the second air flow measurement, control signals for a heating, ventilation, and air conditioning (HVAC) system of the property to update air flow from the HVAC system through at least one vent of the HVAC system.

13. A system comprising:

one or more computers and one or more storage devices storing instructions that are operable, when executed by the one or more computers, to cause the one or more computers to perform operations comprising:

capturing, by an airborne drone, a first temperature measurement at a first location of a property;

capturing, by the airborne drone, motion data related to actual motion of the airborne drone at the first location;

navigating, by the airborne drone, from the first location to a second location of the property;

capturing, by the airborne drone, a second temperature measurement at the second location of the property;

capturing, by the airborne drone, motion data related to actual motion of the airborne drone at the second location;

determining, using the motion data captured at the first location, a first air flow measurement for the first location comprising a difference between expected motion of the airborne drone in still air at the first location and the actual motion of the airborne drone at the first location;

determining, using the motion data captured at the second location, a second air flow measurement for the second location comprising a different between expected motion of the airborne drone in still air at the second location and the actual motion of the airborne drone at the second location;

generating a thermal model for the property using the first temperature measurement, the second temperature measurement, the first air flow measurement, the second air flow measurement; and providing the thermal model for output.

14. The system of claim 13, wherein generating thermal model for the property based on the first temperature measurement and the second temperature measurement comprises:

generating the thermal model to specify a region-specific temperature measurement in each region of the property.

15. The system of claim 13, wherein generating the thermal model for the property based on the first temperature measurement and the second temperature measurement comprises:

generating the thermal model to indicate that the first location has the first temperature measurement and the second location has the second temperature measurement.

16. The system of claim 13, wherein generating the thermal model for the property based on the first temperature measurement and the second temperature measurement comprises:
generating the thermal model to specify that the thermal model corresponds to a particular time of day.

17. The system of claim 13, wherein generating the thermal model for the property based on the first temperature measurement and the second temperature measurement comprises:
generating the thermal model to specify a positive or negative bias of each region of the property relative to a temperature regulator in a fixed location of the property.

18. The system of claim 13, wherein navigating from the first location to the second location of the property comprises following a navigation path with a predefined sequence of regions within a property.

19. The system of claim 13, wherein capturing the first temperature measurement at the first location of the property is performed with a temperature sensor attached to a probe extending from a body of the airborne drone.

20. A non-transitory computer-readable medium storing software comprising instructions executable by one or more computers which, upon such execution, cause the one or more computers to perform operations comprising:
capturing, by an airborne drone, a first temperature measurement at a first location of a property;
capturing, by the airborne drone, motion data related to actual motion of the airborne drone at the first location;
navigating, by the airborne drone, from the first location to a second location of the property;
capturing, by the airborne drone, a second temperature measurement at the second location of the property;
capturing, by the airborne drone, motion data related to actual motion of the airborne drone at the second location;
determining, using the motion data captured at the first location, a first air flow measurement for the first location comprising a difference between expected motion of the airborne drone in still air at the first location and the actual motion of the airborne drone at the first location;
determining, using the motion data captured at the second location, a second air flow measurement for the second location comprising a different between expected motion of the airborne drone in still air at the second location and the actual motion of the airborne drone at the second location;
generating a thermal model for the property using the first temperature measurement the second temperature measurement, the first air flow measurement, the second air flow measurement; and
providing the thermal model for output.

\* \* \* \* \*